(12) United States Patent
Zhang et al.

(10) Patent No.: US 12,278,784 B2
(45) Date of Patent: Apr. 15, 2025

(54) METHOD AND DEVICE FOR SENDING BANDWIDTH REQUEST, AND STORAGE MEDIUM AND ELECTRONIC DEVICE

(71) Applicant: ZTE Corporation, Shenzhen (CN)

(72) Inventors: Weiliang Zhang, Shenzhen (CN); Liquan Yuan, Shenzhen (CN); Yong Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 349 days.

(21) Appl. No.: 17/642,743

(22) PCT Filed: Aug. 10, 2020

(86) PCT No.: PCT/CN2020/108224
§ 371 (c)(1),
(2) Date: Mar. 14, 2022

(87) PCT Pub. No.: WO2021/168639
PCT Pub. Date: Apr. 15, 2021

(65) Prior Publication Data
US 2022/0329395 A1    Oct. 13, 2022

(30) Foreign Application Priority Data

Oct. 12, 2019   (CN) .......................... 201910975843.6

(51) Int. Cl.
*H04L 5/00*   (2006.01)
*H04Q 11/00*  (2006.01)

(52) U.S. Cl.
CPC .......... *H04L 5/0064* (2013.01); *H04L 5/0091* (2013.01); *H04Q 11/0067* (2013.01)

(58) Field of Classification Search
CPC ..... H04B 10/27; H04L 5/0064; H04L 5/0091; H04Q 11/0062; H04Q 11/0067; H04W 28/16; H04W 28/20
See application file for complete search history.

(56) References Cited

U.S. PATENT DOCUMENTS 8,107,824 B2 * 1/2012 Tsuchiya ............ H04Q 11/0067
                                                    396/168
8,184,976 B2 * 5/2012 Kazawa ................ H04J 3/0682
                                                    398/67

(Continued)

FOREIGN PATENT DOCUMENTS

CN      1614944 A       5/2005
CN    101583056 A      11/2009

(Continued)

OTHER PUBLICATIONS

International Search Report for corresponding application PCT/CN2020/108224 filed Aug. 10, 2020, Mail date Oct. 21, 2020.

(Continued)

*Primary Examiner* — Alpus Hsu
(74) *Attorney, Agent, or Firm* — CANTOR COLBURN LLP

(57) ABSTRACT

Embodiments of the present disclosure provide a method and device for sending a bandwidth request, and a storage medium and an electronic device. The method includes: in a bandwidth allocation acquired by a transmission container, sending a payload and a bandwidth request in sequence to an optical line terminal (OLT), wherein the payload carries first data, the bandwidth request carries a data volume of a second data, and the data volume of the second data is a data volume cached in the transmission container when the bandwidth request is generated.

19 Claims, 6 Drawing Sheets

ONU

In a bandwidth allocation acquired by a transmission container, send a payload and a bandwidth request in sequence to an OLT, wherein the payload carries first data, the bandwidth request carries a data volume of second data, and the data volume of the second data is a data volume cached in the transmission container when the bandwidth request is generated — S102

OLT

(56) References Cited

U.S. PATENT DOCUMENTS

| | | | | |
|---|---|---|---|---|
| 8,391,715 B2* | 3/2013 | Niibe | ................ | H04B 10/0793 |
| | | | | 398/100 |
| 8,406,636 B2* | 3/2013 | Zou | .................... | H04L 12/2861 |
| | | | | 398/52 |
| 8,428,457 B2* | 4/2013 | Mizutani | ............ | H04Q 11/0067 |
| | | | | 398/43 |
| 8,462,761 B2* | 6/2013 | Spinar | .................. | H04W 28/20 |
| | | | | 370/329 |
| 8,462,809 B2* | 6/2013 | Spinar | .................. | H04W 28/20 |
| | | | | 370/336 |
| 8,824,504 B2* | 9/2014 | Zou | .................... | H04J 14/0283 |
| | | | | 370/395.51 |
| 8,934,772 B2* | 1/2015 | Zhang | ................ | H04Q 11/0067 |
| | | | | 398/43 |
| 9,203,545 B2* | 12/2015 | Zheng | .................. | H04J 3/1694 |
| 9,225,570 B2* | 12/2015 | Doo | ...................... | H04L 5/0044 |
| 9,819,599 B2* | 11/2017 | Jin | ...................... | H04L 41/0896 |
| 2011/0013573 A1* | 1/2011 | Kim | ...................... | H04W 28/20 |
| | | | | 370/329 |
| 2012/0087662 A1* | 4/2012 | Suzuki | ................ | H04J 14/0282 |
| | | | | 398/66 |
| 2014/0308038 A1* | 10/2014 | Zheng | ................ | H04Q 11/0067 |
| | | | | 398/68 |
| 2015/0373430 A1 | 12/2015 | Kim | | |
| 2016/0286290 A1* | 9/2016 | Zheng | .................. | H04B 10/272 |

FOREIGN PATENT DOCUMENTS

| | | | |
|---|---|---|---|
| CN | 101686177 | A | 3/2010 |
| CN | 101997761 | A | 3/2011 |
| CN | 10211821 | A | 7/2011 |
| CN | 102118212 | A | 7/2011 |
| CN | 103281218 | A | 9/2013 |
| CN | 104053076 | A | 9/2014 |
| CN | 105530201 | A | 4/2016 |
| CN | 110234041 | A | 9/2019 |
| EP | 2111055 | A1 | 10/2009 |
| EP | 3076622 | A1 | 10/2016 |
| EP | 3621254 | A1 | 3/2020 |
| WO | 2013189017 | A1 | 12/2013 |
| WO | 2015085543 | A1 | 6/2015 |
| WO | 2018176730 | A1 | 10/2018 |

OTHER PUBLICATIONS

ETSI, "Access Terminals, Transmission and Multiplexing (ATTM); Network Termination (NT) in Next Generation Network architectures" ETSI TS 102 973 V1.1.1 (Sep. 2008).

European Search Report for corresponding application EP875444; Report dated Nov. 22, 2022.

ITU-T, "Series G: Transmission Systems and Media, Digital System and Networks" Feb. 22, 2004.

* cited by examiner

METHOD AND DEVICE FOR SENDING BANDWIDTH REQUEST, AND STORAGE MEDIUM AND ELECTRONIC DEVICE

CROSS REFERENCE

This application is a National Stage Filing of the PCT International Application No. PCT/CN2020/108224 filed on Aug. 10, 2020, which claims priority to Chinese Application No. 201910975843.6 filed on Oct. 12, 2019, the entirety of which is herein incorporated by reference.

TECHNICAL FIELD

The present disclosure relates to the technical field of communications, and in particular, relates to a method and device for sending a bandwidth request, and a storage medium and an electronic device.

BACKGROUND

A passive optical network (PON) architecture is as shown in FIG. 1, and is a point-to-multipoint network architecture consisting of an optical line terminal (OLT), an optical distribute network (ODN), and an optical network unit (ONU). The OLT is connected to a plurality of optical network units through the ODN.

Upstream sending performed by different ONUs needs to be coordinated by the OLT through bandwidth allocation so as to avoid conflicts between signals sent by different ONUs. A PON system generally calculates an upstream bandwidth of each ONU through dynamic bandwidth assignment (DBA).

In a traditional DBA algorithm, the ONU reports a situation about local data to be sent to the OLT, and the OLT allocates a bandwidth to the ONU according to the situation reported by the ONU. The situation about the local data to be sent is indicated by a dynamic bandwidth request upstream (DBRu). One bandwidth allocation includes a DBRu and a payload. In a bandwidth allocation cycle, data carried in the payload is sent immediately after the DBRu is sent, the situation about the cache data, requesting for bandwidth allocation, indicated in the DBRu contains the subsequently sent data carried in the payload, and therefore, when the OLT receives the DBRu, the situation about the data to be sent by the ONU indicated in the DBRu should no longer include the data carried in the payload. At this time, the situation, acquired by the OLT, about the data to be sent in the ONU is inconsistent with the actual situation about the data to be sent. That is, the situation, acquired by the OLT, about the data to be sent in the ONU is inaccurate, which in turn leads to inaccurate DBA allocation.

In view of the inaccuracy of the situation, acquired by the OLT, about the data to be sent in the ONU, which in turn leads to inaccurate DBA allocation in the related technology, no effective solution has yet been proposed at present.

SUMMARY

Embodiments of the present disclosure provide a method and device for sending a bandwidth request, and a storage medium and an electronic device, which can at least solve the problem that inaccuracy of a situation, acquired by an OLT, about data to be sent in an ONU leads to inaccurate DBA allocation in the related technology.

According to an embodiment of the present disclosure, a method for sending a bandwidth request is provided, including the following operation. In bandwidth allocation acquired by a transmission container, a payload and a bandwidth request are sent in sequence to an OLT, wherein the payload carries first data, the bandwidth request carries a data volume of second data, and the data volume of the second data is a data volume cached in the transmission container when the bandwidth request is generated.

According to an embodiment of the present disclosure, a method for sending a bandwidth request is provided, including the following operation. In a bandwidth allocation acquired by a transmission container, a bandwidth request and a payload are sent in sequence to an OLT, wherein the payload carries first data, the bandwidth request carries a data volume of second data, and the data volume of the second data is acquired by subtracting a data volume of the first data from a data volume cached in the transmission container when the bandwidth request is generated.

According to an embodiment of the present disclosure, a method for sending a bandwidth request is provided, including the following operations. In a bandwidth allocation acquired by a transmission container, a bandwidth request and a payload are sent in sequence to an OLT, wherein the payload carries first data, the bandwidth request carries a data volume of second data, and the data volume of the second data is a data volume cached in the transmission container when the bandwidth request is generated. The OLT subtracts a data volume of the first data from the data volume of the second data to acquire a data volume of third data and allocates a bandwidth according to the data volume of the third data.

According to an embodiment of the present disclosure, a method for sending a bandwidth request is also provided, including the following operation. A mode for sending a bandwidth request is appointed between an ONU and an OLT, wherein the ONU includes one or more transmission containers. The mode for sending the bandwidth request includes at least one of the following: in a bandwidth allocation acquired by a transmission container, sending a first payload and a first bandwidth request in sequence to the OLT, wherein the first payload carries first data, the first bandwidth request carries a data volume of second data, and the data volume of the second data is a data volume cached in the transmission container when the first bandwidth request is generated; in a bandwidth allocation acquired by a transmission container, sending a second bandwidth request and a second payload in sequence to the OLT, wherein the second payload carries third data, the second bandwidth request carries a data volume of fourth data, the data volume of the fourth data is acquired by subtracting a data volume of the third data from a data volume cached in the transmission container when the second bandwidth request is generated; in a bandwidth allocation acquired by a transmission container, sending a third bandwidth request and a third payload in sequence to the OLT, wherein the third payload carries fifth data, the third bandwidth request carries a data volume of sixth data, the data volume of the sixth data is a data volume cached in the transmission container when the third bandwidth request is generated, and the OLT subtracts a data volume of the fifth data from the data volume of the sixth data to acquire a data volume of seventh data and allocates a bandwidth according to the data volume of the seventh data; and in a bandwidth allocation acquired by a transmission container, sending a fourth bandwidth request and a fourth payload in sequence to the OLT, wherein the fourth payload carries eighth data, the fourth bandwidth request carries a data volume of ninth data, and the data volume of the ninth data is a data volume cached in the transmission container when the fourth bandwidth request is generated.

According to an embodiment of the present disclosure, a device for sending a bandwidth request is provided, including: a first sending module configured to, in a bandwidth allocation acquired by a transmission container, send a payload and a bandwidth request in sequence to an OLT, wherein the payload carries first data, the bandwidth request carries a data volume of second data, and the data volume of the second data is a data volume cached in the transmission container when the bandwidth request is generated.

According to an embodiment of the present disclosure, a device for sending a bandwidth request is provided, including: a second sending module configured to, in a bandwidth allocation acquired by a transmission container, send a bandwidth request and a payload in sequence to an OLT, wherein the payload carries first data, the bandwidth request carries a data volume of second data, and the data volume of the second data is acquired by subtracting a data volume of the first data from a data volume cached in the transmission container when the bandwidth request is generated.

According to an embodiment of the present disclosure, a device for sending a bandwidth request is provided, including: a third sending module configured to, in a bandwidth allocation acquired by a transmission container, send a bandwidth request and a payload in sequence to an OLT, wherein the payload carries first data, the bandwidth request carries a data volume of second data, and the data volume of the second data is a data volume cached in the transmission container when the bandwidth request is generated; and an allocating module configured to subtract a data volume of the first data from the data volume of the second data to acquire a data volume of third data and allocate a bandwidth according to the data volume of the third data.

According to an embodiment of the present disclosure, a device for sending a bandwidth request is also provided, including: an appointing module configured to appoint a mode for sending a bandwidth request between an ONU and an OLT, wherein the ONU includes one or more transmission container. The mode for sending the bandwidth request includes at least one of the following: in a bandwidth allocation acquired by a transmission container, sending a first payload and a first bandwidth request in sequence to the OLT, wherein the first payload carries first data, the first bandwidth request carries a data volume of second data, and the data volume of the second data is a data volume cached in the transmission container when the first bandwidth request is generated; in a bandwidth allocation acquired by a transmission container, sending a second bandwidth request and a second payload in sequence to the OLT, wherein the second payload carries third data, the second bandwidth request carries a data volume of fourth data, the data volume of the fourth data is acquired by subtracting a data volume of the third data from a data volume cached in the transmission container when the second bandwidth request is generated; in a bandwidth allocation acquired by a transmission container, sending a third bandwidth request and a third payload in sequence to the OLT, wherein the third payload carries fifth data, the third bandwidth request carries a data volume of sixth data, the data volume of the sixth data is a data volume cached in the transmission container when the third bandwidth request is generated, and the OLT subtracts a data volume of the fifth data from the data volume of the sixth data to acquire a data volume of seventh data and allocates a bandwidth according to the data volume of the seventh data; and in a bandwidth allocation acquired by a transmission container, sending a fourth bandwidth request and a fourth payload in sequence to the OLT, wherein the fourth payload carries eighth data, the fourth bandwidth request carries a data volume of ninth data, and the data volume of the ninth data is a data volume cached in the transmission container when the fourth bandwidth request is generated.

According to another aspect of the embodiments of the present disclosure, a computer-readable storage medium is also provided. The storage medium stores a computer program, wherein the computer program is configured to execute the above-mentioned method for sending a bandwidth request at runtime.

According to another aspect of the embodiments of the present disclosure, an electronic device is also provided, including a memory, a processor, and a computer program stored in the memory and executable on the processor, wherein the processor executes the above-mentioned method for sending a bandwidth request when running the computer program.

By means of the embodiments of the present disclosure, in a bandwidth allocation acquired by a transmission container, a payload and a bandwidth request are sent in sequence to an OLT. The payload carries first data, the bandwidth request carries a data volume of the second data, and the data volume of the second data is a data volume cached in the transmission container when the bandwidth request is generated. The sending order of the payload and the bandwidth request is adjusted, so that when the bandwidth request is sent, the first data carried in the payload is no longer indicated in the current bandwidth allocation, and the data volume of the second data carried in the bandwidth request is closer to an actual data volume to be sent in the current bandwidth allocation. By virtue of the solution, the problem that inaccuracy of a situation, acquired by an OLT, about data to be sent in an ONU leads to inaccurate DBA allocation in the related technology is solved, and the accuracy of OLT bandwidth allocation is improved.

BRIEF DESCRIPTION OF THE DRAWINGS

The accompanying drawings described here are used to provide a further understanding of the present disclosure and form a part of the present disclosure. The schematic embodiments and descriptions of the present disclosure are used to explain the present disclosure and do not constitute an improper limitation on the present disclosure. In the drawings.

DETAILED DESCRIPTION

The present disclosure will be described in detail below with reference to the accompanying drawings and in combination with embodiments. It should be noted that the embodiments of the present disclosure and features in the embodiments may be combined with each other without conflicts.

It should be noted that the terms "first", "second", etc. in the specification and claims of the present disclosure and the above drawings are used to distinguish similar objects, and do not have to be used to describe a specific order or sequence.

Figure 1:
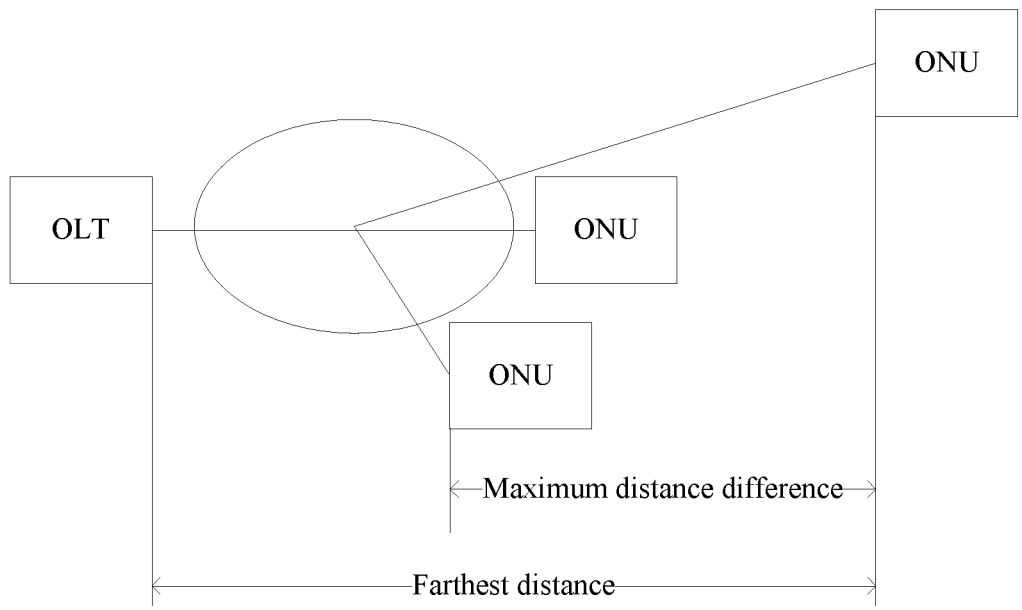
FIG. 1 is a schematic architecture diagram of a PON in the related technology.
Figure 2:
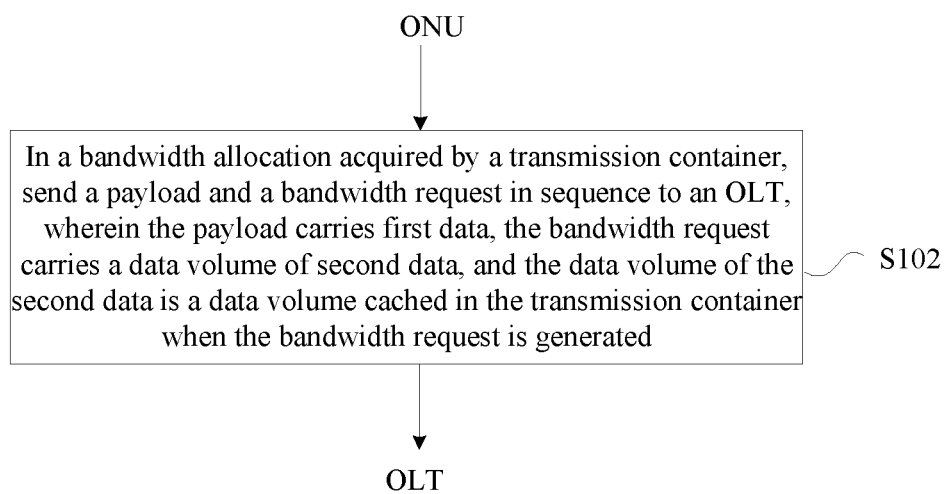
FIG. 2 is a flow chart of an exemplary method for sending a bandwidth request according to an embodiment of the present disclosure.

An embodiment of the present disclosure provides a method for sending a bandwidth request. FIG. 2 is a flow chart of an exemplary method for sending a bandwidth request in an embodiment of the present disclosure. As shown in FIG. 2, the method includes operation S102.

At S102, in a bandwidth allocation acquired by a transmission container, a payload and a bandwidth request are sent in sequence to an OLT, wherein the payload carries first data, the bandwidth request carries a data volume of second data, and the data volume of the second data is a data volume cached in the transmission container when the bandwidth request is generated.

By means of the above-mentioned method, in a bandwidth allocation acquired by a transmission container, a payload and a bandwidth request are sent in sequence to an OLT. The payload carries first data, the bandwidth request carries a data volume of the second data, and the data volume of the second data is a data volume cached in the transmission container when the bandwidth request is generated. The sending order of the payload and the bandwidth request is adjusted, so that when the bandwidth request is sent, the first data carried in the payload is no longer indicated in the current bandwidth allocation, and the data volume of the second data carried in the bandwidth request is closer to an actual data volume to be sent in the current bandwidth allocation. By virtue of the solution, the problem that inaccuracy of a situation, acquired by an OLT, about data to be sent in an ONU leads to inaccurate DBA allocation in the related technology is solved, and the accuracy of OLT bandwidth allocation is improved.

It should be noted that the transmission container may be expressed by T-CONT. One ONU includes one or more T-COUNTs. The bandwidth request is sent in a unit of ONU. When the ONU sends the payload or the bandwidth request to the OLT at each time, each ONU includes one or more bandwidth allocations of one or more T-COUNTs.

As an exemplary implementation, the operation that, in the bandwidth allocation acquired by the transmission container, the payload and the bandwidth request are sent in sequence to the OLT includes: in the bandwidth allocation acquired by the transmission container, the payload is sent to the OLT, and after the payload is sent to the OLT, the bandwidth request is sent at a tail position of the bandwidth allocation. A difference between a generating moment of the bandwidth request and a sending moment of the bandwidth request is less than or equal to a preset difference.

If the bandwidth request is closer to the tail position of the bandwidth allocation, the data volume of the second data carried in the bandwidth request is closer to the data volume cached in the bandwidth allocation, and the OLT has higher accuracy of allocating resources according to the data volume in the bandwidth request. The difference between the generating moment of the bandwidth request and the sending moment of the bandwidth request being less than or equal to the preset difference can be understood that if the difference between the generating moment of the bandwidth request and the sending moment of the bandwidth request is smaller, the generating duration of the bandwidth request is shorter, the generating speed is higher, and the data volume of the second data is closer to an actually cached data volume in the bandwidth allocation.

As an exemplary implementation, before sending the bandwidth request to the OLT, the method further includes at least one of the following operations. First indication information is sent to the OLT, wherein the first indication information is used for indicating a sending order of the payload and the bandwidth request in the bandwidth allocation. Second indication information sent by the OLT is received, wherein the second indication information is used for indicating a sending order of the payload and the bandwidth request in the bandwidth allocation.

The ONU and the OLT need to make an appointment on the sending order, and the specific manner may be that the ONU sends report information about the sending order to the OLT or the OLT indicates the sending order to the ONU. The OLT knows that the sending order of the payload and the bandwidth request is that the bandwidth request is sent after the payload is sent, and can directly allocate the bandwidth by use of the data volume of the second data to be sent carried in the bandwidth request.

Figure 3:
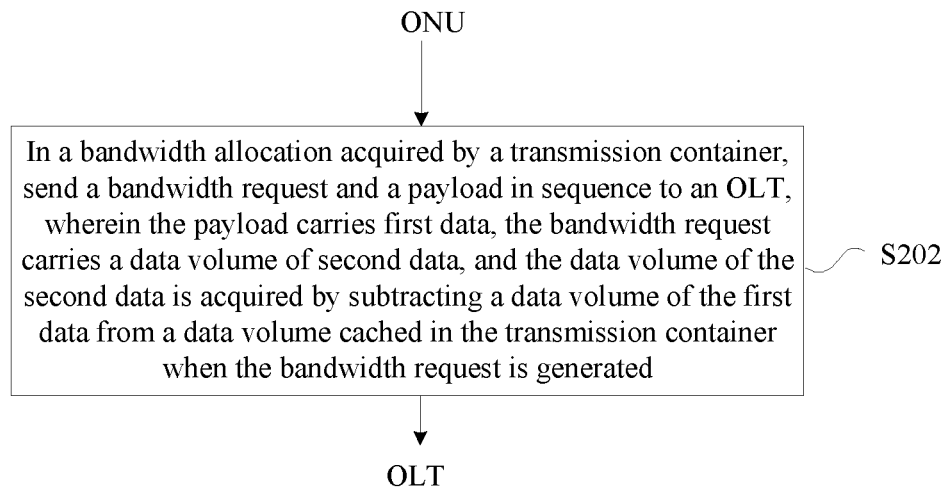
FIG. 3 is a flow chart (I) of another exemplary method for sending a bandwidth request in an embodiment of the present disclosure.

An embodiment of the present disclosure provides a method for sending a bandwidth request. FIG. 3 is a flow chart (I) of an exemplary method for sending a bandwidth request in an embodiment of the present disclosure. As shown in FIG. 3, the method includes operation S202.

At S202, in a bandwidth allocation acquired by a transmission container, a bandwidth request and a payload are sent in sequence to an OLT, wherein the payload carries first data, the bandwidth request carries a data volume of second data, and the data volume of the second data is acquired by subtracting a data volume of the first data from a data volume cached in the transmission container when the bandwidth request is generated.

It should be noted that when the sending order of the payload and the bandwidth request is not changed, the data volume in the bandwidth request may be acquired by the above-mentioned calculating method. When the bandwidth request is sent, the data volume of the first data carried in the subsequently sent payload is subtracted from the total data volume cached in the current bandwidth allocation, so as to basically acquire a bandwidth that is really requested by the current bandwidth request.

As an exemplary implementation, before the bandwidth request and the payload are sent in sequence to the OLT, the method further includes at least one of the following operations. First indication information is sent to the OLT, wherein the first indication information is used for indicating a sending order of the payload and the bandwidth request in the bandwidth allocation, and/or a calculating mode of the data volume of the second data. Second indication information sent by the OLT is received, wherein the second indication information is used for indicating a sending order of the payload and the bandwidth request in the bandwidth allocation, and/or a calculating mode of the data volume of the second data.

Figure 4:
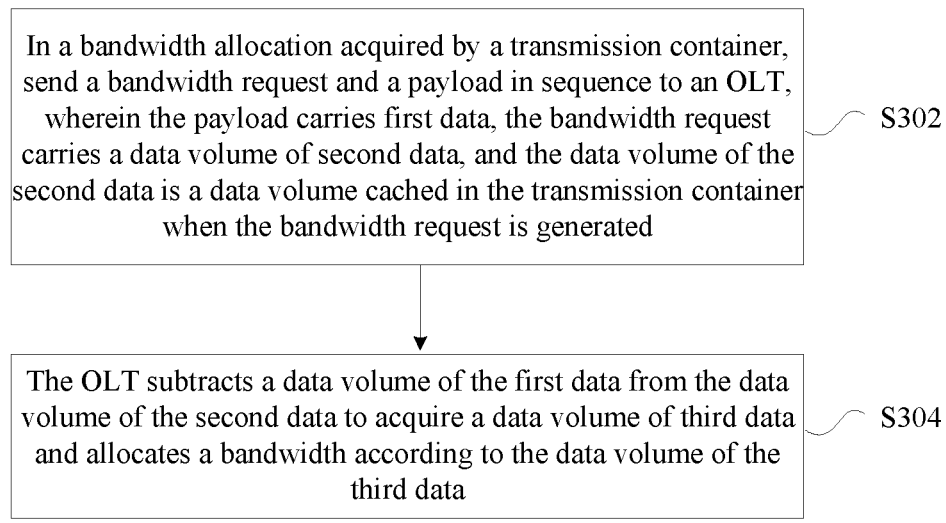
FIG. 4 is a flow chart (II) of yet another exemplary method for sending a bandwidth request in an embodiment of the present disclosure.

According to an embodiment of the present disclosure, a method for sending a bandwidth request is provided. FIG. 4 is a flow chart (II) of another exemplary method for sending a bandwidth request in an embodiment of the present disclosure. As shown in FIG. 4, the method includes operations S302 and S304.

At S302, in a bandwidth allocation acquired by a transmission container, a bandwidth request and a payload are sent in sequence to an OLT, wherein the payload carries first data, the bandwidth request carries a data volume of second data, and the data volume of the second data is a data volume cached in the transmission container when the bandwidth request is generated.

At S304, the OLT subtracts a data volume of the first data from the data volume of the second data to acquire a data volume of third data, and allocates a bandwidth according to the data volume of the third data.

It should be noted that the OLT may be indicated, at the same time when the bandwidth request is sent, to subtract the data volume of the first data from the data volume of the second data to acquire the data volume of the third data and allocate, according to the data volume of the third data, the bandwidth. Alternatively, the OLT may also be indicated in a manner other than the bandwidth request, for example, the OLT may be indicated by an ONU through other report information or indication information. Alternatively, the OLT and the ONU may make an appointment in advance. Alternatively, the OLT may send an indication to the ONU. The embodiment of the present disclosure does not limit the specific manner adopted.

When the sending order of the payload and the bandwidth request in the bandwidth allocation is that the payload is sent after the bandwidth request is sent, the ONU, when sending the bandwidth request, may subtract the data volume of the cached data carried in the payload from the data volume carried in the bandwidth request, and send the data volume acquired by subtraction to the OLT to request for allocating a bandwidth. This is a calculating action executed at the ONU. Alternatively, this action may also be executed at the OLT. For example, an optical multiplex unit (OMU) directly sends the bandwidth request and the payload to the OLT, and the OLT subtracts the data volume of the cached data carried in the payload from the data volume carried in the bandwidth request and then allocates, according to the data volume acquired by subtraction, the bandwidth to the ONU. If the sending order is that the bandwidth request is sent after the payload is sent, there is no need to execute the subtraction operation. After a part of the cached data is carried in the payload and sent, the data volume in the bandwidth request no longer includes the part of cached data carried in the payload, so the bandwidth can be directly allocated according to the data volume carried in the payload.

As an exemplary implementation, before in the bandwidth allocation acquired by the transmission container, the bandwidth request and the payload are sent in sequence to the OLT, the method further includes at least one of the following operations. First indication information is sent to the OLT, wherein the first indication information is used for indicating a sending order of the payload and the bandwidth request in the bandwidth allocation, and/or a calculating mode of the data volume of the third data. Second indication information sent by the OLT is received, wherein the second indication information is used for indicating a sending order of the payload and the bandwidth request in the bandwidth allocation, and/or a calculating mode of the data volume of the third data.

Figure 5:
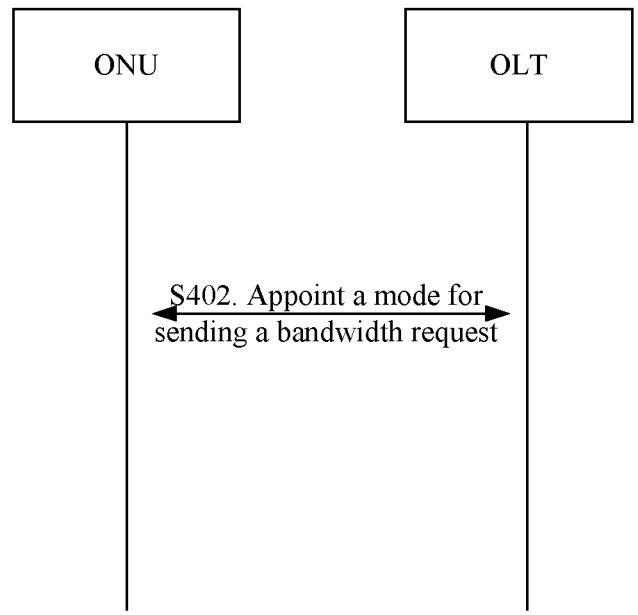
FIG. 5 is a flow chart (III) of a further exemplary method for sending a bandwidth request in an embodiment of the present disclosure.

There are at least four modes for the ONU to send the bandwidth request, but a sending mode needs to be appointed or negotiated between the ONU and the OLT; or one of the ONU and the OLT reports or indicates a sending mode, and the other one of the ONU and the OLT can make a cooperation to complete the calculating process. FIG. 5 is a flow chart (III) of yet another exemplary method for sending a bandwidth request in an embodiment of the present disclosure. As shown in FIG. 5, the method includes operation S402.

At S402, a mode for sending a bandwidth request is appointed between an ONU and an OLT, wherein the ONU includes one or more transmission containers, and the mode for sending the bandwidth request includes at least one of the following:

in a bandwidth allocation acquired by a transmission container, sending a first payload and a first bandwidth request in sequence to the OLT, wherein the first payload carries first data, the first bandwidth request carries a data volume of second data, and the data volume of the second data is a data volume cached in the transmission container when the first bandwidth request is generated;

in a bandwidth allocation acquired by a transmission container, sending a second bandwidth request and a second payload in sequence to the OLT, wherein the second payload carries third data, the second bandwidth request carries a data volume of fourth data, the data volume of the fourth data is acquired by subtracting a data volume of the third data from a data volume cached in the transmission container when the second bandwidth request is generated;

in a bandwidth allocation acquired by a transmission container, sending a third bandwidth request and a third payload in sequence to the OLT, wherein the third payload carries fifth data, the third bandwidth request carries a data volume of sixth data, the data volume of the sixth data is a data volume cached in the transmission container when the third bandwidth request is generated, and the OLT subtracts a data volume of the fifth data from the data volume of the sixth data to acquire a data volume of seventh data and allocates a bandwidth according to the data volume of the seventh data; and in a bandwidth allocation acquired by a transmission container, sending a fourth bandwidth request and a fourth payload in sequence to the OLT, wherein the fourth payload carries eighth data, the fourth bandwidth request carries a data volume of ninth data, and the data volume of the ninth data is a data volume cached in the transmission container when the fourth bandwidth request is generated.

As an exemplary implementation, the operation that the mode for sending the bandwidth request is appointed between the ONU and the OLT includes at least one of the following operations. The ONU sends first indication information to the OLT, wherein the first indication information is used for indicating the mode for sending the bandwidth request. The ONU receives second indication information sent by the OLT, wherein the second indication information is used for indicating the mode for sending the bandwidth request.

It should be noted that for all the foregoing method embodiments, for the sake of simple description, they are all expressed as a series of action combinations, but those having ordinary skill in the art should know that the present disclosure is not limited by the described order of actions. According to the present disclosure, some operations can be executed in other orders or simultaneously. Secondly, those having ordinary skill in the art should also know that the embodiments described in the specification are all exemplary embodiments, and the actions and modules involved are not necessarily required by the present disclosure.

Through the description of the above implementations, those having ordinary skill in the art can clearly understand that the method according to the above embodiment can be implemented by means of software and necessary general hardware platforms, of course, it can also be implemented by hardware, but in many cases, the former is preferred implementation. Based on this understanding, the technical solution of the present disclosure essentially or the part that contributes to the conventional technology can be embodied in the form of a software product, and the computer software product is stored in one storage medium (such as a read-only memory (ROM)/a random access memory (RAM), a magnetic disk, and an optical disk) and includes several instructions to enable a terminal device (which can be a mobile phone, a computer, a server, or a network device, etc.) to execute the methods described in the various embodiments of the present disclosure.

In this embodiment, a device for sending a bandwidth request is also provided. The device is used for realizing the above embodiment and exemplary implementations. Those described will not be repeatedly described. As used below, the term "module" can implement a combination of software and/or hardware with predetermined functions. Although the devices described in the following embodiments are preferably implemented by software, implementation by hardware or a combination of software and hardware is also possible and conceived.

Figure 6:
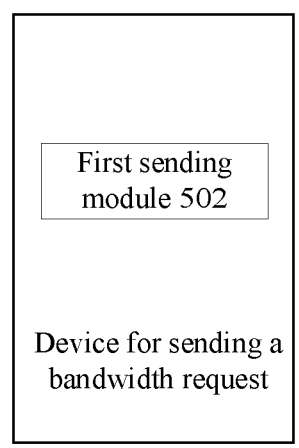
FIG. 6 is a structural block diagram (I) of an exemplary device for sending a bandwidth request in an embodiment of the present disclosure.

FIG. 6 is a structural block diagram (I) of an exemplary device for sending a bandwidth request according to an embodiment of the present disclosure. As shown in FIG. 6, the device includes a first sending module 502.

The first sending module 502 is configured to, in a bandwidth allocation acquired by a transmission container, send a payload and a bandwidth request in sequence to an OLT, wherein the payload carries first data, the bandwidth request carries a data volume of second data, and the data volume of the second data is a data volume cached in the transmission container when the bandwidth request is generated.

As an exemplary implementation, the first sending module 502 includes a first sending unit and a second sending unit. The first sending unit is configured to, in a bandwidth allocation acquired by a transmission container, send the payload the OLT. The second sending unit is configured to, after the payload is sent to the OLT, send the bandwidth request at a tail position of the bandwidth allocation, wherein a difference between a generating moment of the bandwidth request and a sending moment of the bandwidth request is less than or equal to a preset difference.

As an exemplary implementation, the device further includes a first indication information sending module and a first receiving module. The first indication information sending module is configured to send first indication information to the OLT, wherein the first indication information is used for indicating a sending order of the payload and the bandwidth request in the bandwidth allocation. The first receiving module is configured to receive second indication information sent by the OLT, wherein the second indication information is used for indicating a sending order of the payload and the bandwidth request in the bandwidth allocation.

Figure 7:
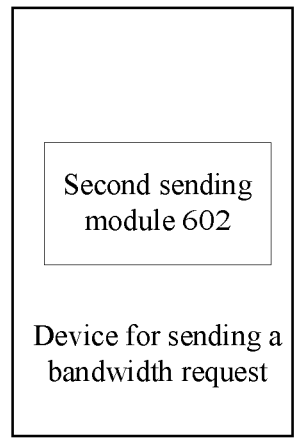
FIG. 7 is a structural block diagram (II) of an exemplary device for sending a bandwidth request in an embodiment of the present disclosure.

FIG. 7 is a structural block diagram (II) of an exemplary device for sending a bandwidth request according to an embodiment of the present disclosure. As shown in FIG. 7, the device includes a second sending module 602.

The second sending module 602 is configured to, in the bandwidth allocation acquired by a transmission container, send a bandwidth request and a payload in sequence to an OLT, wherein the payload carries first data, the bandwidth request carries a data volume of second data, and the data volume of the second data is acquired by subtracting a data volume of the first data from a data volume cached in the transmission container when the bandwidth request is generated.

As an exemplary implementation, the device further includes a second indication information sending module and a second receiving module. The second indication information sending module is configured to send first indication information to the OLT, wherein the first indication information is used for indicating a sending order of the payload and the bandwidth request in the bandwidth allocation, and/or a calculating mode of the data volume of the second data to be sent. The second receiving module is configured to receive second indication information sent by the OLT, wherein the second indication information is used for indicating a sending order of the payload and the bandwidth request in the bandwidth allocation, and/or a calculating mode of the data volume of the second data to be sent.

Figure 8:
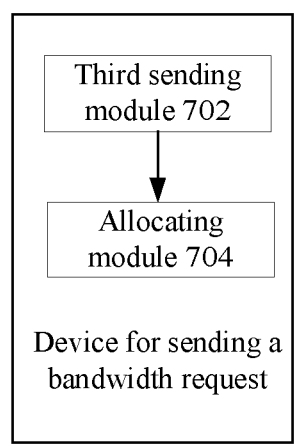
FIG. 8 is a structural block diagram (III) of an exemplary device for sending a bandwidth request in an embodiment of the present disclosure.

FIG. 8 is a structural block diagram (III) of an exemplary device for sending a bandwidth request according to an embodiment of the present disclosure. As shown in FIG. 8, the device includes a third sending module 702 and an allocating module 704.

The third sending module 702 is configured to, in a bandwidth allocation acquired by a transmission container, send a bandwidth request and a payload in sequence to an OLT, wherein the payload carries first data, the bandwidth request carries a data volume of second data, and the data volume of the second data is a data volume cached in the transmission container when the bandwidth request is generated.

The allocating module 704 is configured to subtract a data volume of the first data from the data volume of the second data to acquire a data volume of third data and allocate a bandwidth according to the data volume of the third data.

As an exemplary implementation, the device further includes a third indication information sending module and a third receiving module. The third indication information sending module is configured to send first indication information to the OLT, wherein the first indication information is used for indicating a sending order of the payload and the bandwidth request in the bandwidth allocation, and/or a calculating mode of the data volume of the third data. The third receiving module is configured to receive second indication information sent by the OLT, wherein the second indication information is used for indicating a sending order of the payload and the bandwidth request in the bandwidth allocation, and/or a calculating mode of the data volume of the third data.

Figure 9:
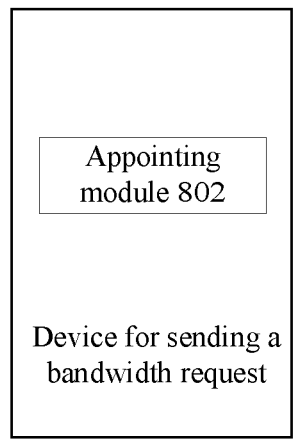
FIG. 9 is a structural block diagram (IV) of an exemplary device for sending a bandwidth request in an embodiment of the present disclosure.

FIG. 9 is a structural block diagram (IV) of an exemplary device for sending a bandwidth request according to an embodiment of the present disclosure. As shown in FIG. 9, the device includes an appointing module 802.

The appointing module 802 is configured to appoint a mode for sending a bandwidth request between an ONU and an OLT, wherein the ONU includes one or more transmission containers. The mode for sending the bandwidth request includes at least one of the following: in a bandwidth allocation acquired by a transmission container, sending a first payload and a first bandwidth request in sequence to the OLT, wherein the first payload carries first data, the first bandwidth request carries a data volume of second data, and the data volume of the second data is a data volume cached in the transmission container when the first bandwidth request is generated; in a bandwidth allocation acquired by a transmission container, sending a second bandwidth request and a second payload in sequence to the OLT, wherein the second payload carries third data, the second bandwidth request carries a data volume of fourth data, the data volume of the fourth data is acquired by subtracting a data volume of the third data from a data volume cached in the transmission container when the second bandwidth request is generated; in a bandwidth allocation acquired by a transmission container, sending a third bandwidth request and a third payload in sequence to the OLT, wherein the third payload carries fifth data, the third bandwidth request carries a data volume of sixth data, the data volume of the sixth data is a data volume cached in the transmission container when the third bandwidth request is generated, and the OLT subtracts a data volume of the fifth data from the data volume of the sixth data to acquire a data volume of seventh data and allocates a bandwidth according to the data volume of the seventh data; and in a bandwidth allocation acquired by a transmission container, sending a fourth bandwidth request and a fourth payload in sequence to the OLT, wherein the fourth payload carries eighth data, the fourth bandwidth request carries a data volume of ninth data, and the data volume of the ninth data is a data volume cached in the transmission container when the fourth bandwidth request is generated.

As an exemplary implementation, the appointing module 802 includes a sending unit and a receiving unit. The sending unit is configured to send first indication information to the OLT, wherein the first indication information is used for indicating the mode for sending the bandwidth request. The receiving unit is configured to receive second indication information sent by the OLT, wherein the second indication information is used for indicating the mode for sending the bandwidth request.

The above-mentioned device for sending a bandwidth request includes a processor and a memory. The above-mentioned first sending module 502, second sending module 602, third sending module 702, allocating module 704, and appointing module 802 are all used as program units stored in the memory, and the processor executes the above-mentioned program units stored in the memory to realize corresponding functions.

The processor includes a kernel which calls the corresponding program units from the memory. One or more kernels are provided. The sending order of the payload and the bandwidth request is adjusted. Alternatively, the data volume carried in the payload is subtracted from the data volume carried in the bandwidth request to acquire a corresponding bandwidth allocation, which solves the problem that inaccuracy of a situation, acquired by an OLT, about data to be sent in an ONU leads to inaccurate DBA allocation in the related technology, and improves the accuracy of OLT bandwidth allocation.

The memory may include a volatile memory in a computer-readable medium, a random access memory (RAM) and/or a non-volatile memory, etc., such as a read-only memory (ROM) or a flash RAM. The memory includes at least one storage chip.

In order to better understand the solutions recorded in the embodiments, specific descriptions are made below in combination with the accompanying drawings.

X gigabit-capable passive optical networks (XG-PON) are taken as an example. A situation about local data to be sent is indicated by a dynamic bandwidth request upstream (DBRu), and data (which is carried in an XGTC payload) is sent immediately after the DBRu is sent in one bandwidth allocation. According to an XG-PON standard, the DBRu includes the subsequently sent data (i.e. data carried in the XGTC payload). Such a DBRu report includes the data that has been sent, and since the DBRu is sent at the front part of the bandwidth allocation, so the acquired situation about the data to be sent is not the latest situation. This DBRu method may report inaccurate local data information to be sent to the OLT, which will lead to inaccurate DBA allocation.

Figure 10:
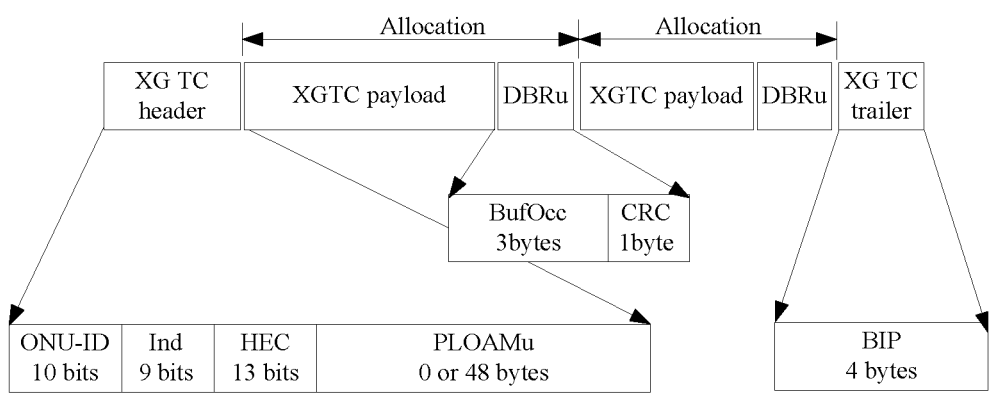
FIG. 10 is a schematic diagram (I) of an exemplary bandwidth allocation structure according to an embodiment of the present disclosure.

In order to solve the above problem, an embodiment of the present disclosure provides a method for sending a bandwidth request. FIG. 10 is a schematic diagram of an exemplary bandwidth allocation structure according to an embodiment of the present disclosure. As shown in FIG. 10, in the improved DBA report method, in a bandwidth allocation, the data is sent before the DBRu is sent. A generating moment of the DBRu is close to or the same as a sending moment of the DBRu as much as possible, so that the DBRu carries latest situation about the data to be sent. As shown in FIG. 10, in an upstream frame format, the DBRu is set at the end of the bandwidth allocation, i.e., after the XGTC payload. The XGTC payload carries the sent data. In the DBRu, BufOcc, i.e. the data volume of cached data, is indicated by three bytes; and a cyclic redundancy check (CRC) code is indicated by one byte.

Data sending: after an ONU acquires a bandwidth corresponding to a T-CONT, a bandwidth corresponding to the DBRu is reserved, data is carried in the XGTC payload and sent, and the DBRu is prepared. The time for preparing the DBRu is before the end of the bandwidth of the T-CONT and is kept as late as possible, so as to acquire the latest situation about the data to be sent in a cache as much as possible.

Figure 11:
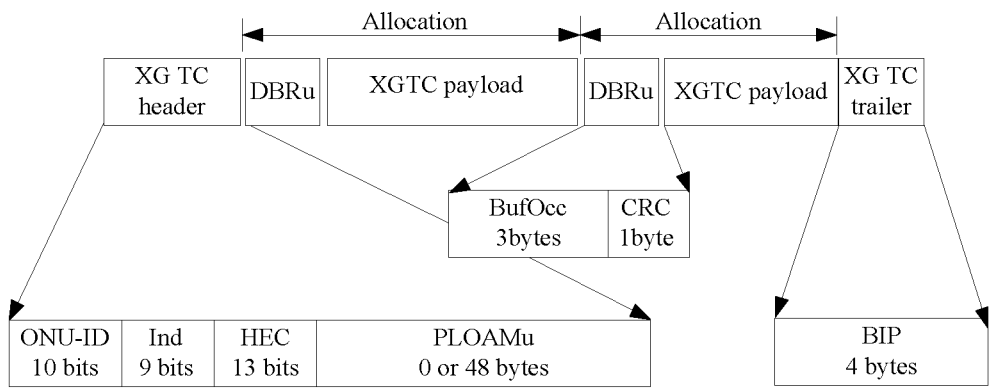
FIG. 11 is a schematic diagram (II) of an exemplary bandwidth allocation structure according to an embodiment of the present disclosure.

FIG. 11 is a schematic diagram of an exemplary bandwidth allocation structure according to an embodiment of the present disclosure. As shown in FIG. 11, an ONU still adopts a conventional DBRu report method. However, after an OLT receives cached data in DBRu and a data volume in a subsequent XGTC payload, the data volume is subtracted from the cached data to acquire cached data reported by the ONU.

As shown in FIG. 11, the ONU still adopts the conventional DBRu report method. However, before reporting, the ONU subtracts the data volume sent in the subsequent XGTC payload from the acquired cached data to acquire the cached data reported by the ONU, and the cached data is sent in a DBRu region.

The sending structural diagram shown in FIG. 11 is compatible with the conventional DBRu report method. The ONU selects a report method and indicates which report method is adopted in an upstream frame. In the improved DBA report method, in a bandwidth allocation, data (payload) is sent first, and then the DBRu is sent. A generating moment of the DBRu is close to or the same as a sending moment of the DBRu as much as possible, so that the DBRu carries latest situation about the data to be sent. As shown in FIG. 10, in an upstream frame format, the DBRu is set at the end of the bandwidth allocation, i.e., after the XGTC payload, wherein the XGTC payload carries the sent data.

Data sending: after an ONU acquires a bandwidth corresponding to a T-CONT, a bandwidth corresponding to the DBRu is reserved, data is carried in the XGTC payload and sent, and the DBRu is prepared. The time for preparing the DBRu is before the end of the bandwidth of the T-CONT and is kept as late as possible, so as to acquire the latest situation about the data to be sent in a cache as much as possible.

There is a 9 bits Ind domain in an XGTC header of an upstream frame used for indicating part of upstream-sent options, original definitions of the Ind domain are as shown in the following table:

| Bits | Definition |
| --- | --- |
| 8 | PLOAM queue status, used for reporting a status of a PLOAM message queue |
| 7-1 | Reserved |
| 0 | Dying Gasp |

Improved definitions of the Ind domain are:

| Bits | Definition |
| --- | --- |
| 8 | PLOAM queue status, used for reporting a status of a PLOAM message queue |
| 7-6 | 00-Original DBRu report method<br>01-New DBRu report method<br>10-Original DBRu report method, the OLT processes the DBRu<br>11-The report position of DBRu is at a start position of the bandwidth allocation, but the ONU processes the DBRu |
| 5-1 | Reserved |
| 0 | Dying Gasp |

The bits 7-6 of the Ind domain being 10 indicates an improvement of the original DBRu report method: the ONU still reports the DBRu according to the original method, and the OLT needs to subtract the subsequently sent data volume from the DBRu and use the subtraction result as the situation about the data to be transmitted.

In the transmitting structure diagram shown in FIG. 11, it is also possible that the OLT indicates the ONU to adopt which DBRu report method. In the improved DBA report method, in a bandwidth allocation, data is sent first, and then the DBRu is sent. A generating moment of the DBRu is close to or the same as a sending moment of the DBRu as much as possible, so that the DBRu carries latest situation about the data to be sent. In an upstream frame format, the DBRu is set at the end of the bandwidth allocation, i.e., after the XGTC payload. The XGTC payload carries the sent data.

Data sending: after an ONU acquires a bandwidth corresponding to a T-CONT, a bandwidth corresponding to the DBRu is reserved, data is carried in the XGTC payload and sent, and the DBRu is prepared. The time for preparing the DBRu is before the end of the bandwidth of the T-CONT and is kept as late as possible, so as to acquire the latest situation about the data to be sent in a cache as much as possible.

There is a 9 bits Ind domain in an XGTC header of an upstream frame used for indicating part of upstream-sent options, original definitions of the Ind domain are:

| Bits | Definition |
| --- | --- |
| 8 | PLOAM queue status, used for reporting a status of a PLOAM message queue |
| 7-1 | Reserved |
| 0 | Dying Gasp |

Improved definitions of the Ind domain are:

| Bits | Definition |
| --- | --- |
| 8 | PLOAM queue status, used for reporting a status of a PLOAM message queue |
| 7-6 | 00-Original DBRu report method<br>01-New DBRu report method<br>10-Original DBRu report method, the OLT processes the DBRu<br>11- The report position of DBRu is at a start position of the bandwidth allocation, but the ONU processes the DBRu |
| 5-1 | Reserved |
| 0 | Dying Gasp |

The bits 7-6 of the Ind domain being 10 indicates an improvement of the original DBRu report method: the ONU still reports the DBRu according to the original method, and the OLT needs to subtract the subsequently sent data volume from the DBRu and use the subtraction result as the situation about the data to be transmitted.

The OLT indicates the ONU to adopt which DBRu report method on a downstream frame. This can be implemented by modifying the profile of an existing PLOAM message, referring to the definitions of bits 34-35 in the table.

| Octet | Content | Description |
| --- | --- | --- |
| 1-2 | ONU-ID | Directed message to one ONU or broadcast message to all ONUs. As a broadcast to all ONUs, ONU-ID = 0x03FF. |
| 3 | 0x01 | Message type ID "Profile". |
| 4 | SeqNo | Unicast or broadcast PLOAM sequence number, as appropriate. |
| 5 | VVVV00PP | VVVV-Four-bit profile version. If the content of the profile changes, the OLT should ensure that the version also changes, so that the ONU can detect updates solely on the basis of the version field.<br>PP-Two-bit profile index. |
| 6 | 0000 000F | FEC indication. F = 1: FEC on, F = 0: FEC off. |
| 7 | 0000 DDDD | DDDD-Delimiter length in octets; four-bit integer, range 0.8. |

-continued

| Octet | Content | Description |
|---|---|---|
| 8-15 | Delimiter | Aligned with the most significant end of the field; padded with 0x00; padding treated as "don't care" by the receiver |
| 16 | 0000 LLLL | LLLL-Preamble length in octets; four-bit integer; range 1-8. |
| 17 | 000R RRRR | RRRR-Five-bit preamble repeat count, range 0-31. The value 0 specifies that the preamble is not transmitted at all. |
| 18-25 | Preamble | Preamble pattern, aligned with the most significant end of the field; padded with 0x00; padding treated as "don't care" by the receiver. |
| 26-33 | PON-TAG | An 8-byte static identity of the OLT PON port that is chosen by the operator and is used to blind the master session key (MSK) to the context of the security association (see clause 15.3.3). It is recommended that PON-TAG be unique within at least the operator's domain and fixed for the lifetime of the system. For example, it may be acquired as a concatenation of 4-byte OLT Vendor-ID and a 4-byte VSSN of the PON port. |
| 34 | DBRu | The highest two bits of the byte:<br>00-Original DBRu report method<br>01-New DBRu report method<br>10-Original DBRu report method, the OLT processes the DBRu<br>11-The report position of DBRu is at a start position of the bandwidth allocation, but the ONU processes the DBRu |
| 35-40 | Padding | Set to 0x00 by the transmitter, treated as "don't care" by the receiver. |
| 41-48 | MIC | Message integrity check. |

An embodiment of the present disclosure provides a storage medium storing a program. The program, when executed by the processor, implements the method for sending a bandwidth request. An embodiment of the present disclosure provides a processor. The processor is used for running a program. The program executes the method for sending a bandwidth request at runtime.

Figure 12:
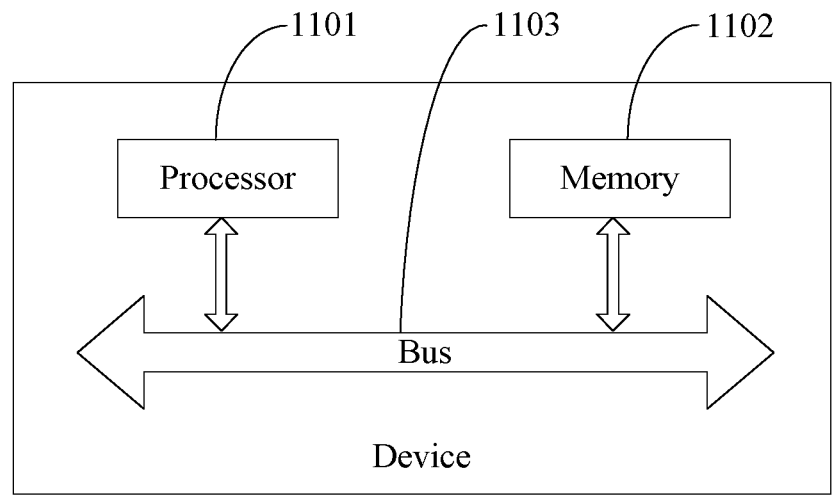
FIG. 12 is a structural block diagram of an exemplary device according to an embodiment of the present disclosure.

FIG. 12 is a structural block diagram of an exemplary electronic device (equipment) according to an embodiment of the present disclosure. An embodiment of the present disclosure provides a device. The device includes at least one processor 1101, at least one memory 1102 connected with the processor, and a bus 1103. The processor and the memory complete mutual communication through a bus. The processor is configured to call a program instruction from the memory to execute the above-mentioned method for sending a bandwidth request. The device herein may be a server, a personal computer (PC), a PAD, a mobile phone, and the like.

The present disclosure provides a computer program product. When executed on a data processing device, the computer program product is suitable for executing and initializing a program having the following method operation S1.

At S1, in a bandwidth allocation acquired by a transmission container, a payload and a bandwidth request are sent in sequence to an OLT, wherein the payload carries first data, the bandwidth request carries a data volume of second data, and the data volume of the second data is a data volume cached in the transmission container when the bandwidth request is generated.

As an exemplary implementation, the computer program product provided by the present disclosure is further suitable for executing a program having the following method operation S1.

At S1, in a bandwidth allocation acquired by a transmission container, a bandwidth request and a payload are sent in sequence to the OLT, wherein the payload carries first data, the bandwidth request carries a data volume of second data, and the data volume of the second data is acquired by subtracting a data volume of the first data from a data volume cached in the transmission container when the bandwidth request is generated.

As an exemplary implementation, the computer program product provided by the present disclosure is further suitable for executing a program having the following method operations S1 and S2.

At S1, in a bandwidth allocation acquired by a transmission container, a bandwidth request and a payload are sent in sequence to the OLT, wherein the payload carries first data, the bandwidth request carries a data volume of second data, and the data volume of the second data is a data volume cached in the transmission container when the bandwidth request is generated.

At S2, the OLT subtracts a data volume of the first data from the data volume of the second data to acquire a data volume of third data and allocates a bandwidth according to the data volume of the third data.

As an exemplary implementation, the computer program product provided by the present disclosure is further suitable for executing a program having the following method operation S1.

At S1, a mode for sending a bandwidth request is appointed between the ONU and the OLT, wherein the ONU includes one or more transmission containers, and the mode for sending the bandwidth request includes at least one of the following:

in a bandwidth allocation acquired by a transmission container, sending a first payload and a first bandwidth request in sequence to the OLT, wherein the first payload carries first data, the first bandwidth request carries a data volume of second data, and the data volume of the second data is a data volume cached in the transmission container when the first bandwidth request is generated; in a bandwidth allocation acquired by a transmission container, sending a second bandwidth request and a second payload in sequence to the OLT, wherein the second payload carries third data, the second bandwidth request carries a data volume of fourth data, the data volume of the fourth data is acquired by subtracting a data volume of the third data from a data volume cached in the transmission container when the second bandwidth request is generated; in a bandwidth allocation acquired by a transmission container, sending a third bandwidth request and a third payload in sequence to the OLT, wherein the third payload carries fifth data, the third bandwidth request carries a data volume of sixth data, the data volume of the sixth data is a data volume cached in the transmission container when the third bandwidth request is generated, and the OLT subtracts a data volume of the fifth data from the data volume of the sixth data to acquire a data volume of seventh data and allocates a bandwidth according to the data volume of the seventh data; and in a bandwidth allocation acquired by a transmission container, sending a fourth bandwidth request and a fourth payload in sequence to the OLT, wherein the fourth payload carries eighth data, the fourth bandwidth request carries a data volume of ninth data, and the data volume of the ninth data is a data volume cached in the transmission container when the fourth bandwidth request is generated.

The present disclosure is described by referring to flowcharts and/or block diagrams of methods, devices (systems) and computer program products according to the embodiments of the present disclosure. It should be understood that computer program instructions may implement each flow and/or each block in the flow diagrams and/or the block diagrams and combination of the flows and/or the blocks in the flow diagrams and/or the block diagrams. These computer program instructions may be provided for a general puter, a dedicated computer, an embedded processor or processing units of other programmable data processing devices to generate a machine, thereby making the instructions that are executed by the computer or the processing units of other programmable data processing devices generate devices for realizing specified functions in one or multiple flows of the flow diagrams and/or one or multiple blocks of the block diagrams.

In one typical configuration, the device includes one or more processors (e.g., Central Processing Units, CPUs), a memory, and a bus. The device may further include an input/output interface, a network interface, and the like.

The memory may include a volatile memory in a computer-readable medium, a random access memory (RAM) and/or a non-volatile memory, etc., such as a read-only memory (ROM) or a flash RAM. The memory includes at least one storage chip. The memory is an example of the compute-readable medium.

The computer-readable medium includes persistent, non-persistent, movable, and unmovable media that can store information by using any method or technology. The information can be computer-readable instructions, data structures, program modules, or other data. Examples of computer storage media include, but are not limited to, a Phase-change Random Access Memory (PRAM), a Static Random Access Memory (SRAM), a Dynamic Random Access Memory (DRAM), other types of RAMs, an ROM, an Electrically Erasable Programmable Read-Only Memory (EEPROM), a flash memory or other internal memory technologies, a CD-ROM, a Digital Video Disk (DVD) or other optical memories, a magnetic cartridge type magnetic tape, a magnetic tape/disk storage device or other magnetic storage devices or any other non-transmitting media, and may be used for storing information that may be accessed by the computing device. As described in this article, the computer-readable media do not include transitory media, such as modulated data signals and carriers.

It is worthwhile to note that the terms "comprise", "include", or any other variation thereof are intended to cover a non-exclusive inclusion, so that a process, a method, an article, or a device that includes a list of elements includes those elements and further includes other elements not expressly listed or inherent to such a process, method, article, or device. Elements defined by a sentence "includes a/an . . . " do not exclude that the process, method, commodity or device that includes the elements still includes other identical elements without more restrictions.

Persons skilled in the art should understand that the embodiment of the present disclosure may provide a method, a system or a computer program product. Therefore, the present disclosure may adopt the form of a complete hardware embodiment, a complete software embodiment, or a software and hardware combination embodiment. In addition, the present disclosure may adopt the form of a computer program product implemented on one or multiple computer-sensitive storage media (including, but not limited to, a magnetic disk memory, a compact disc read-only memory (CD-ROM), an optical memory and the like) including computer-sensitive program codes.

The above contents are only the embodiments of the present disclosure, but not intended to limit the present disclosure. Those having ordinary skill in the art can make various changes and modifications to the present disclosure. Any modifications, equivalent replacements, improvements and the like that are made without departing from the spirit and the principle of the present disclosure shall all fall within the scope of claims of the present disclosure.

What is claimed is:

1. A method for sending a bandwidth request, comprising:
   in a bandwidth allocation acquired by a transmission container, sending a payload and a bandwidth request in sequence to an optical line terminal (OLT), wherein the transmission container is included within an Optical Network Unit (ONU), the payload carries first data, the bandwidth request carries a volume of second data, and the volume of the second data is a data volume cached in the transmission container when the bandwidth request is generated.

2. The method according to claim 1, wherein in the bandwidth allocation acquired by the transmission container, sending the payload and the bandwidth request in sequence to the OLT comprises:
   in the bandwidth allocation acquired by the transmission container, sending the payload to the OLT; and
   after the payload is sent to the OLT, sending the bandwidth request at a tail position of the bandwidth allocation, wherein a difference between a generating moment of the bandwidth request and a sending moment of the bandwidth request is less than or equal to a preset difference.

3. The method according to claim 1, wherein before sending the bandwidth request to the OLT, the method further comprises at least one of the following:
   sending first indication information to the OLT, wherein the first indication information is used for indicating a sending order of the payload and the bandwidth request in the bandwidth allocation; and
   receiving second indication information sent by the OLT, wherein the second indication information is used for indicating a sending order of the payload and the bandwidth request in the bandwidth allocation.

4. A method for sending a bandwidth request, comprising:
   in a bandwidth allocation acquired by a transmission container, sending a bandwidth request and a payload in sequence to an optical line terminal (OLT), wherein the transmission container is included within an Optical Network Unit (ONU), the payload carries first data, the bandwidth request carries a volume of second data, and the volume of the second data is acquired by subtracting a volume of the first data from a data volume cached in the transmission container when the bandwidth request is generated.

5. The method according to claim 4, wherein before sending the bandwidth request and the payload to the OLT, the method further comprises at least one of the following:
   sending first indication information to the OLT, wherein the first indication information is used for indicating at least one of the following: a sending order of the payload and the bandwidth request in the bandwidth allocation, a calculating mode of the volume of the second data; and
   receiving second indication information sent by the OLT, wherein the second indication information is used for indicating at least one of the following: a sending order of the payload and the bandwidth request in the bandwidth allocation, a calculating mode of the volume of the second data.

6. A method for sending a bandwidth request, comprising:
   in a bandwidth allocation acquired by a transmission container, sending a bandwidth request and a payload in sequence to an optical line terminal (OLT), wherein the transmission container is included within an Optical Network Unit (ONU), the payload carries first data, the bandwidth request carries a volume of second data, and the volume of the second data is a data volume cached in the transmission container when the bandwidth request is generated;
   subtracting, by the OLT, a volume of the first data from the volume of the second data to acquire a volume of third data and allocating, by the OLT, a bandwidth according to the volume of the third data.

7. The method according to claim 6, wherein before in the bandwidth allocation acquired by the transmission container, sending the bandwidth request and the load in sequence to the OLT, the method further comprises at least one of the following:
   sending first indication information to the OLT, wherein the first indication information is used for indicating at least one of the following: a sending order of the payload and the bandwidth request in the bandwidth allocation, a calculating mode of the volume of the third data; and
   receiving second indication information sent by the OLT, wherein the second indication information is used for indicating at least one of the following: a sending order of the payload and the bandwidth request in the bandwidth allocation, a calculating mode of the volume of the third data.

8. The method according to claim 1, further comprising: appointing a mode for sending the bandwidth request between the ONU and the OLT, wherein the ONU comprises one or more transmission containers, and the mode for sending the bandwidth request comprises at least one of the following:
   in a bandwidth allocation acquired by a transmission container, sending a first payload and a first bandwidth request in sequence to the OLT, wherein the first payload carries first data, the first bandwidth request carries a volume of second data, and the volume of the second data is a data volume cached in the transmission container when the first bandwidth request is generated;
   in a bandwidth allocation acquired by a transmission container, sending a second bandwidth request and a second payload in sequence to the OLT, wherein the second payload carries third data, the second bandwidth request carries a volume of fourth data, the volume of the fourth data is acquired by subtracting a volume of the third data from a data volume cached in the transmission container when the second bandwidth request is generated;
   in a bandwidth allocation acquired by a transmission container, sending a third bandwidth request and a third payload in sequence to the OLT, wherein the third payload carries fifth data, the third bandwidth request carries a volume of sixth data, the volume of the sixth data is a data volume cached in the transmission container when the third bandwidth request is generated, and the OLT subtracts a volume of the fifth data from the volume of the sixth data to acquire a volume of seventh data and allocates a bandwidth according to the volume of the seventh data;
   in a bandwidth allocation acquired by a transmission container, sending a fourth bandwidth request and a fourth payload in sequence to the OLT, wherein the fourth payload carries eighth data, the fourth bandwidth request carries a volume of ninth data, and the volume of the ninth data is a volume cached in the transmission container when the fourth bandwidth request is generated.

9. The method according to claim 8, wherein appointing the mode for sending the bandwidth request between the ONU and the OLT comprises at least one of the following:
   sending, by the ONU, first indication information to the OLT, wherein the first indication information is used for indicating the mode for sending the bandwidth request;
   receiving, by the ONU, second indication information sent by the OLT, wherein the second indication information is used for indicating the mode for sending the bandwidth request.

10. A non-transitory computer-readable storage medium, the computer-readable storage medium having a program stored thereon, wherein the program executes the method according to claim 1 at runtime.

11. An electronic device, comprising a memory and a processor, wherein the memory stores a computer program, and the processor is configured to execute the method according to claim 1 when running the computer program.

12. The method according to claim 4, further comprising: appointing a mode for sending the bandwidth request between the ONU and the OLT, wherein the ONU comprises one or more transmission containers, and the mode for sending the bandwidth request comprises at least one of the following:
   in a bandwidth allocation acquired by a transmission container, sending a first payload and a first bandwidth request in sequence to the OLT, wherein the first payload carries first data, the first bandwidth request carries a volume of second data, and the volume of the second data is a data volume cached in the transmission container when the first bandwidth request is generated;
   in a bandwidth allocation acquired by a transmission container, sending a second bandwidth request and a second payload in sequence to the OLT, wherein the second payload carries third data, the second bandwidth request carries a volume of fourth data, the volume of the fourth data is acquired by subtracting a volume of the third data from a data volume cached in the transmission container when the second bandwidth request is generated;

in a bandwidth allocation acquired by a transmission container, sending a third bandwidth request and a third payload in sequence to the OLT, wherein the third payload carries fifth data, the third bandwidth request carries a volume of sixth data, the volume of the sixth data is a data volume cached in the transmission container when the third bandwidth request is generated, and the OLT subtracts a volume of the fifth data from the volume of the sixth data to acquire a volume of seventh data and allocates a bandwidth according to the volume of the seventh data;

in a bandwidth allocation acquired by a transmission container, sending a fourth bandwidth request and a fourth payload in sequence to the OLT, wherein the fourth payload carries eighth data, the fourth bandwidth request carries a volume of ninth data, and the volume of the ninth data is a data volume cached in the transmission container when the fourth bandwidth request is generated.

13. The method according to claim 12, wherein appointing the mode for sending the bandwidth request between the ONU and the OLT comprises at least one of the following:

sending, by the ONU, first indication information to the OLT, wherein the first indication information is used for indicating the mode for sending the bandwidth request;

receiving, by the ONU, second indication information sent by the OLT, wherein the second indication information is used for indicating the mode for sending the bandwidth request.

14. The method according to claim 6, further comprising: appointing a mode for sending the bandwidth request between the ONU and the OLT, wherein the ONU comprises one or more transmission containers, and the mode for sending the bandwidth request comprises at least one of the following:

in a bandwidth allocation acquired by a transmission container, sending a first payload and a first bandwidth request in sequence to the OLT, wherein the first payload carries first data, the first bandwidth request carries a volume of second data, and the volume of the second data is a data volume cached in the transmission container when the first bandwidth request is generated;

in a bandwidth allocation acquired by a transmission container, sending a second bandwidth request and a second payload in sequence to the OLT, wherein the second payload carries third data, the second bandwidth request carries a volume of fourth data, the volume of the fourth data is acquired by subtracting a volume of the third data from a data volume cached in the transmission container when the second bandwidth request is generated;

in a bandwidth allocation acquired by a transmission container, sending a third bandwidth request and a third payload in sequence to the OLT, wherein the third payload carries fifth data, the third bandwidth request carries a volume of sixth data, the volume of the sixth data is a data volume cached in the transmission container when the third bandwidth request is generated, and the OLT subtracts a volume of the fifth data from the volume of the sixth data to acquire a volume of seventh data and allocates a bandwidth according to the volume of the seventh data;

in a bandwidth allocation acquired by a transmission container, sending a fourth bandwidth request and a fourth payload in sequence to the OLT, wherein the fourth payload carries eighth data, the fourth bandwidth request carries a volume of ninth data, and the volume of the ninth data is a data volume cached in the transmission container when the fourth bandwidth request is generated.

15. The method according to claim 14, wherein appointing the mode for sending the bandwidth request between the ONU and the OLT comprises at least one of the following:

sending, by the ONU, first indication information to the OLT, wherein the first indication information is used for indicating the mode for sending the bandwidth request;

receiving, by the ONU, second indication information sent by the OLT, wherein the second indication information is used for indicating the mode for sending the bandwidth request.

16. A non-transitory computer-readable storage medium, the computer-readable storage medium having a program stored thereon, wherein the program executes the method according to claim 4 at runtime.

17. An electronic device, comprising a memory and a processor, wherein the memory stores a computer program, and the processor is configured to execute the method according to claim 4 when running the computer program.

18. A non-transitory computer-readable storage medium, the computer-readable storage medium having a program stored thereon, wherein the program executes the method according to claim 6 at runtime.

19. An electronic device, comprising a memory and a processor, wherein the memory stores a computer program, and the processor is configured to execute the method according to claim 6 when running the computer program.

* * * * *